Patented Dec. 30, 1941

2,268,177

UNITED STATES PATENT OFFICE 2,268,177

INTERPOLYMERS OF METHYL ALPHA-CHLOROACRYLATE AND STYRENE AND PREPARATION OF SAME

Harold W. Arnold, Marshallton, Del., assignor to E. I. du Pont de Nemours & Company, Wilmington, Del., a corporation of Delaware No Drawing. Application April 29, 1939, Serial No. 270,846

9 Claims. (Cl. 260—84)

This invention relates to interpolymers and their preparation and, more particularly, to interpolymers of methyl alpha-chloroacrylate and styrene.

An object of the present invention is to provide new and useful synthetic resins. A further object is to provide homogeneous interpolymers containing substantial amounts of methyl alpha-chloroacrylate, which interpolymers are unique in exhibiting better stability to heat and light and better solubility and mechanical strength than methyl alpha-chloroacrylate polymers heretofore known. A still further object is to provide a practical and economical method of preparing interpolymers of methyl alpha-chloroacrylate and styrene. Other objects will be apparent from the description of the invention given hereinafter.

The above objects are accomplished according to the present invention by mixing monomeric methyl alpha-chloroacrylate and monomeric styrene in approximately equimolar quantities and subjecting the mixture to polymerizing conditions wherein, preferably, oxidation and/or hydrolysis are minimized. The methyl alpha-chloroacrylate should amount to 45-55 mole per cent of the interpolymer.

It has now been discovered that homogeneous, heat and light stable interpolymers of methyl alpha-chloroacrylate and styrene can be prepared if both monomers used are highly purified and free of polymer, and provided the monomeric constituents are present in substantially equimolar proportions. The polymers of methyl alpha-chloroacrylate and styrene are incompatible with the interpolymers herein considered and, hence, the presence of traces of either polymer in the monomers before mixing will result in non-homogeneous products of inferior properties. It has also been found that compositions in the narrow range of ingredient proportions specified are unique from the standpoint of complete homogeneity and light and heat stability.

In the case of styrene, it is particularly important to take precautions to avoid the presence of traces of polymer in the monomer. Inhibitor-free styrene polymerizes slowly even at temperatures well below 0° C. and, therefore, cannot be stored for more than several hours without the formation of small amounts of polymer. It is advisable that both the methyl alpha-chloroacrylate and styrene be carefully distilled just prior to interpolymerization. Also, it is advisable that the distillation be carried out under as low a pressure as can conveniently be attained (10-20 mm.), to avoid the possibility of polymer formation in various portions of the distilling apparatus other than the still pot.

In carrying out the interpolymerization of the present invention, any of the known methods of polymerization may be utilized. However, the conditions should be such that oxidation and/or hydrolysis of the monomers or interpolymer formed are minimized so far as possible since both styrene and methyl alpha-chloroacrylate are susceptible to oxidative degradation. Such conditions include low temperature, low concentrations or complete absence of oxygen-liberating catalysts, minimum contact with air, and relatively short time of contact with aqueous media.

One of the preferred methods for carrying out the preferred polymerization involves heating the mixture of monomers in suitable non-corrosive vessels equipped with reflux condensers at carefully controlled temperatures (preferably 50-80° C.) under moderate vacuum. The vacuum may be so adjusted that, at the temperature of polymerization, moderate refluxing of the monomeric mixture occurs. If over-heating of the mass should occur due to the exothermic nature of the polymerization reaction, self-cooling is effected through an increase in the rate of influx. In employing this method of polymerization, the usual peroxidic type of polymerization catalyst may be advantageously omitted since the process proceeds sufficiently rapidly to be economically feasible at any rate and the resulting product has a markedly superior stability to light and heat.

Employing the above method of polymerization, the finished polymer is produced in the form of a clear, colorless, brilliant, hard, tough mass. To remove any traces of monomeric materials, the vessel containing the mass of polymer is subjected to a high vacuum without refluxing and an elevated temperature for a short time, i. e., about 100° C. for ½ to 1 hour. Employing this method in large scale production, the polymerization vessel may be equipped with an outlet valve at the bottom and a means of applying considerable gas pressure so that, on completion of the polymerization, the polymer may be heated above its softening temperature and extruded through the valve by the application of pressure.

Another suitable method of interpolymerization which yields the polymer in a finely divided form easily handled in washing, drying, and molding operations is the so-called "granular" method which involves rapidly agitating the mixture of highly purified, freshly distilled, polymer-free monomers containing a small percentage (not more than 0.8%) of a peroxidic polymerization catalyst such as benzoyl peroxide, hydrogen peroxide, or the like, with an aqueous solution containing a small percentage (up to 1%) of a protective colloid of the type of soluble starch, methyl starch, partially hydrolyzed polyvinyl acetate, the sodium salts of polymers or interpolymers containing acrylic or methacrylic acid, poly-methacrylamide, sodium starch glycolate, sodium cellulose glycolate, and the like, in a vessel equipped with a reflux condenser, at such temperature that moderate reflux is maintained. Under these conditions polymerization occurs quite rapidly, depending to some extent on the catalyst concentration, to give the polymer in the form of small granules or globules which remain suspended in the aqueous medium so long as rapid agitation is maintained, but which settle out rapidly when the agitation is suspended. The globules or granules are readily filtered from the mixture, washed free of occluded protective colloid, and dried.

Methyl alpha-chloroacrylate, a relatively new material from the standpoint of polymerization and interpolymerization, may be readily prepared by either of two methods: (1) The dehydrohalogenation of methyl alpha, beta-dichloropropionate by means of a tertiary amine such as dimethyl aniline; (2) The reaction of trichloroethylene with formaldehyde in the presence of concentrated sulfuric acid, followed by dehydration and esterification with methanol, according to the method disclosed in U. S. application Serial No. 235,900, filed October 19, 1938, in the names of J. W. C. Crawford et al., and entitled "Polymeric compositions from alpha-chloracrylic acid and its derivatives."

In the following examples which illustrate specific embodiments of the invention, all parts are given by weight unless otherwise stated. In each instance the monomeric methyl alpha-chloroacrylate used in the examples was prepared by method 2 outlined above.

*Example 1*

A mixture of 25 parts of freshly distilled polymer-free methyl alpha-chloroacrylate and 25 parts of highly purified polymer-free styrene was heated under a reflux condenser in a bath maintained constant at 50° C., at a pressure of 350 mm. Within 36 hours the mixture had completely solidified to a clear, colorless, hard, tough, bubble-free mass. To insure complete polymerization, the mixture was heated further at 50° C. for 80 hours. At the end of this time the condenser was removed and the polymerization vessel subjected to a pressure of 50 mm. and a temperature of 100° C. for approximately one-half hour. After this treatment the weight of the polymeric mass indicated a quantitative yield. The color and clarity had not been altered from that at the end of 36 hours. A portion of the mass was crushed and molded at 160° C. for approximately 20 minutes. A perfectly clear, colorless, hard, tough molding was produced. This softened at approximately 81° C. when immersed in a heated oil bath.

*Example 2*

A mixture of 27 parts of freshly distilled polymer-free methyl alpha-chloroacrylate and 23 parts of highly purified polymer-free styrene was polymerized under the conditions used in Example 1. Polymerization was complete within 36 hours to give a clear, colorless, hard, tough, bubble-free mass which showed excellent stability to heat and light.

*Example 3*

A mixture of 28 parts of purified methyl alpha-chloro-acrylate and 22 parts of polymer-free styrene was polymerized under the conditions of Example 1. Polymerization was complete within 36 hours to give a clear, colorless, bubble-free, hard, tough mass which showed very good stability to light and heat.

*Example 4*

A solution of 0.2 part of methyl starch in 150 parts of water was placed in a vessel fitted with an anchor-shaped stirrer, a reflux condenser, and a thermometer whose bulb was placed well above the surface of the liquid. The vessel was heated in a water-bath maintained at 94–96° C., and the solution rapidly stirred. When the temperature of the solution in the vessel reached 60° C., a mixture of 30 parts of freshly distilled, polymer-free methyl alpha-chloroacrylate and 30 parts of purified, polymer-free styrene containing 0.12 part of benzoyl peroxide, was introduced. The temperature rose rapidly until refluxing took place at 92° C. Refluxing continued at this temperature for approximately 35 minutes. At this point the temperature rose to 96° C. within 15 minutes and refluxing ceased. The mixture was heated further at 90° C. for 10 minutes with continued rapid stirring. It was then filtered through filter cloth. The product remained on the filter in the form of fine granules. It was washed repeatedly with water until the washings became clear, and then dried at 80° C. for about two hours. Fifty-seven parts of product were obtained. A portion of the product was molded at 160° C. for about 10 minutes. The resulting article was clear, colorless, hard, and fairly tough. It softened at approximately 103° C. when immersed in a heated oil bath.

*Example 5*

A mixture of 50 parts of methyl alpha-chloroacrylate and 50 parts of styrene, both polymer-free, containing 0.15 part of benzoyl peroxide, was polymerized as in Example 4, the dispersing medium in this case consisting of 250 parts of a 0.1% solution of sodium starch glycolate in water. Refluxing ceased, indicating complete polymerization, within 40 minutes after the addition of the monomer mixture. Heating at approximately 90° C. was continued for 10 minutes thereafter. The mixture was filtered and washed as in Example 4. The product remained on the filter in the form of very small granules. After drying, the yield amounted to 88%. A portion of the product was molded at 160° C. for approximately 10 minutes. The resulting article was clear, virtually colorless, hard, and tough. It softened at 110° C. when immersed in a heated oil bath.

*Example 6*

Polymerization of a mixture of 50 parts of methyl alpha-chloroacrylate and 50 parts of styrene, both of which were polymer-free, was conducted as in Example 4, except that in this case only 0.05 part of benzoyl peroxide was used and the dispersing agent consisted of 200 parts of a 0.1% solution of sodium cellulose glycolate in water. Polymerization was complete within 90 minutes. The product was filtered and washed as in Example 4. The yield of dried product was 91%. A molding of this material softened at approximately 112° C. when immersed in a heated oil bath.

*Example 7*

A mixture of 25 parts of methyl alpha-chloroacrylate and 25 parts of styrene, both freshly distilled and polymer-free, was dissolved in 150 parts of dioxan. The resulting solution was then heated at 50° C. for 96 hours. At the end of this time it had become very viscous. The polymer was precipitated from the solution by the addition of methanol while stirring vigorously. It was filtered off, extracted thoroughly with methanol to remove residual monomers or solvent, and then dried at 70° C. for 48 hours. The yield amounted to 80% of the theoretical. A portion of the product was molded at 160° C. for approximately 10 minutes. The resulting article was clear, colorless, and very hard. It softened at approximately 138° C. when immersed in a heated oil bath.

*Example 8*

A mixture of 50 parts of purified, polymer-free methyl alpha-chloroacrylate and 50 parts of freshly distilled, polymer-free styrene was placed in a vessel and dry sulfur dioxide passed in until the gain in weight corresponded to 2.5 parts. The vessel was then tightly closed and allowed to stand at 24-28° C. for 7 days. By the end of this time polymerization to a clear, colorless, hard, tough mass was complete. The product showed good stability to heat and light.

It will be understood that the above examples are merely illustrative and that the present invention broadly comprises a substantially light and heat stable homogeneous interpolymer of methyl alpha-chloroacrylate and styrene in approximately equimolar proportions as a new composition and the preparation of such interpolymer by subjecting polymer-free methyl alpha-chloroacrylate monomer and polymer-free styrene in approximately equimolar proportions to polymerizing conditions.

Methods of effecting polymerization, other than those illustrated in the examples, may be employed. Thus, the polymerization may be carried out in the presence of diluents such as ketones, aromatic hydrocarbons, esters, chlorinated hydrocarbons, or dioxan which are solvents both for the monomers and the interpolymers. Likewise, the polymerization may be conducted in the presence of diluents such as water-alcohol mixtures, alcohols, or aliphatic hydrocarbons which are solvents for the monomers but non-solvents for the interpolymers.

It is also possible to carry out the polymerization in aqueous emulsion, the mixture of monomers being agitated with aqueous solutions of known emulsifying agents such as alkali metal, ammonium, or amine salts of long chain fatty acids, salts of sulfonic acids such as alkyl naphthalene sulfonic acids, salts of acid sulfuric esters of long chain alcohols, and the like, and the resulting emulsions heated with intermittent or continuous stirring until polymerization is complete.

The usual polymerization catalysts are effective in promoting the interpolymerization of approximately equimolar mixtures of methyl alpha-chloroacrylate and styrene. Among these are hydrogen peroxide, peracetic acid, inorganic perborates, benzoyl peroxide, acetyl benzoyl peroxide, dilauroyl peroxide, dibutyryl peroxide, and succinyl peroxide. Sulfur dioxide is also an effective catalyst. In polymerizations carried out in aqueous media, any of these catalysts may be used but in anhydrous media it is preferable to employ only those which are completely soluble in the monomer mixture. In any case it is highly desirable that the concentration of peroxidic catalyst be kept low (below 0.8%, approximately) to minimize the danger of oxidation of the monomeric or polymeric materials. The preferred range of catalyst concentration is 0.01-0.3%. As is apparent from the examples, the interpolymerization also proceeds readily at moderate temperatures in the absence of any catalyst.

The interpolymerization may be carried out at any temperature between approximately 30° C. and approximately 120° C., the preferred range being from about 50° C. to about 100° C.

The time required for the interpolymerization is largely dependent on the conditions used and may vary from fractions of one hour to several days.

Regardless of the method of polymerization employed, it is desirable that the conditions used in the interpolymerization should be such that the danger of any extensive oxidation and/or hydrolysis of the monomers and/or interpolymers is reduced to a minimum.

The herein considered interpolymers of methyl alpha-chloroacrylate and styrene may be prepared in bulk in containers of any shape to give castings having the shape of the container. They may also be shaped or formed by sawing, drilling, filing, turning, etc. They may be molded by the known methods of moldings, and they may be formed into foils or films by casting from solution or by hot pressing. Also, the solutions of the interpolymers may be spun to produce synthetic fibers or used as adhesives for various common materials. The interpolymers are of value in electrical applications and in applications requiring resistance to burning. They are adapted for the preparation of molded articles when modified with plasticizers or softeners, fillers, pigments, dyes, and other natural or synthetic resins. They may be used as coating compositions either alone or when mixed with other resins, pigments, dyes, and plasticizers or softeners. Such compositions may be used for coating or impregnating surfaces such as wood, textiles, leather, metals, glass, paper, stone, brick, concrete, plaster, and the like.

An advantage of the present invention is that it provides a new interpolymer having superior properties which adapt it for wide use in the plastics and coating fields. A further advantage is that the invention provides a new polymer which is clear, perfectly homogeneous, and highly stable to heat and light. The new interpolymer may be readily and economically prepared according to the present invention, the rate of polymerization being very nearly the same as that of straight methyl alpha-chloroacrylate although it would be expected that the rate of polymerization would not be substantially greater than that of the relatively slow polymerizing styrene.

As many apparently widely different embodiments of this invention may be made without departing from the spirit and scope thereof, it is to be understood that the invention is not limited to the specific embodiments thereof except as defined in the appended claims.

I claim:

1. A completely homogeneous, heat and light stable product resulting from co-polymerization of an approximately equimolar mixture of polymer-free monomeric methyl alpha-chloroacrylate and polymer-free monomeric styrene.

2. Process comprising subjecting an approximately equimolar mixture of polymer-free monomeric methyl alpha-chloroacrylate and polymer-free monomeric styrene to polymerizing conditions.

3. Process comprising subjecting an approximately equimolar mixture of polmer-free, freshly distilled methyl alpha-chloroacrylate and polymer-free, freshly distilled monomeric styrene to polymerizing conditions.

4. Process comprising heating an approximately equimolar mixture of polymer-free monomeric methyl alpha-chloroacrylate and polymer-free monomeric styrene until converted to a solid interpolymer, the temperature of said reaction mixture being maintained between 50–80° C.

5. Process comprising refluxing an approximately equimolar mixture of polymer-free monomeric methyl alpha-chloroacrylate and polymer-free monomeric styrene, the operation being carried out under temperature and vacuum conditions such that the rate of reflux will maintain the temperature of the reaction mixture between 50–80° C.

6. Process comprising continuously agitating an approximately equimolar mixture of polymer-free monomeric methyl alpha-chloroacrylate and polymer-free monomeric styrene in an aqueous medium containing a protective colloid at an elevated temperature until said mixture of monomers is converted to solid granular interpolymer.

7. Process comprising continuously agitating an approximately equimolar mixture of polymer-free monomeric methyl alpha-chloroacrylate and polymer-free monomeric styrene containing a polymerization catalyst, in an aqueous medium containing a protective colloid at an elevated temperature until said mixture of monomers is converted to solid granular interpolymer.

8. Process comprising dissolving an approximately equimolar mixture of polymer-free monomeric methyl alpha-chloroacrylate and polymer-free monomeric styrene in an organic solvent and subjecting said solution to an elevated temperature to polymerize said mixture of monomers.

9. Process comprising dissolving an approximately equimolar mixture of polymer-free monomeric methyl alpha-chloroacrylate and polymer-free monomeric styrene in an organic solvent capable of dissolving the interpolymer to be formed, subjecting said solution to an elevated temperature to polymerize the monomeric components thereof, and then adding a non-solvent liquid to the reaction liquid to precipitate the interpolymer formed.

HAROLD W. ARNOLD.